Patented July 17, 1934

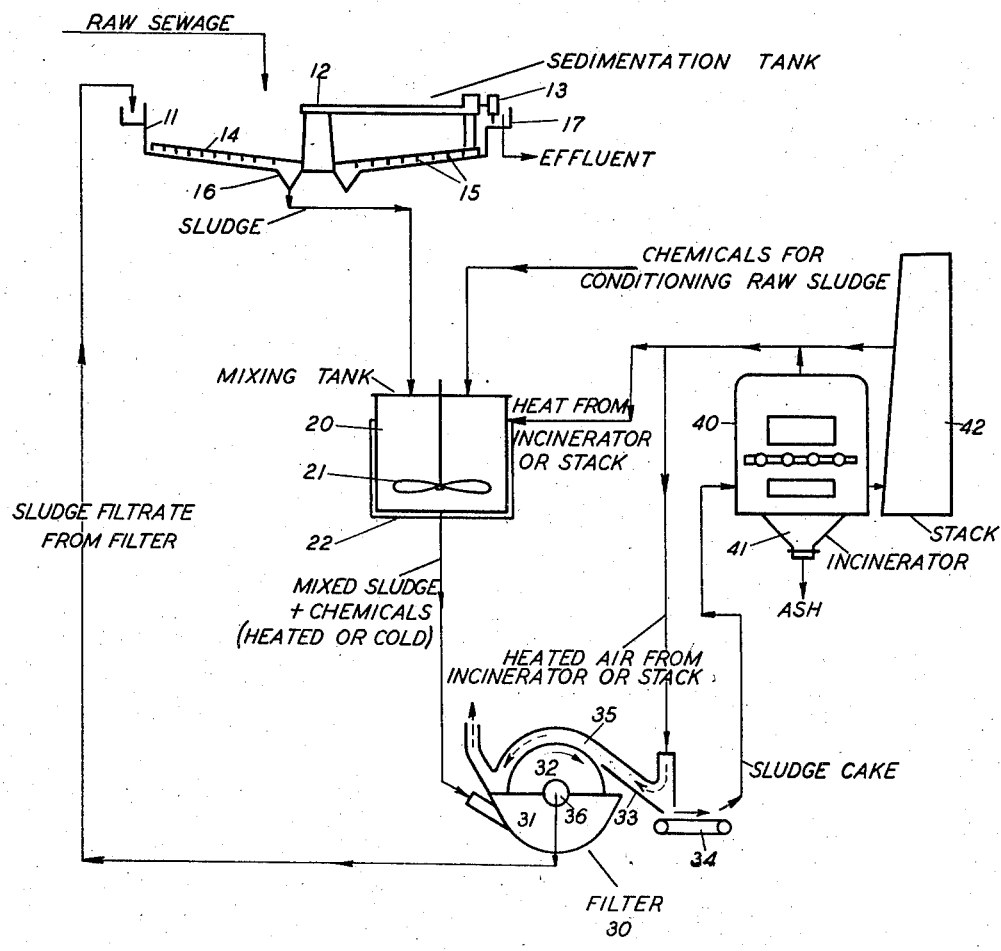

1,967,197

UNITED STATES PATENT OFFICE 1,967,197

SEWAGE TREATMENT

Edmund B. Besselievre, Spring Lake, N. J., assignor to The Dorr Company, Inc., New York, N. Y., a corporation of Delaware Application August 10, 1931, Serial No. 556,041

1 Claim. (Cl. 210—2)

In the process of treating municipal sewage, it is essential to provide a settling tank or sedimentation basin to remove from the sewage those solids which will settle to the bottom of the tank in a given period. To assist in the collection of these solids, and their removal from their tank, it is common practice to equip the settling tank with a mechanism which sweeps the tank bottom substantially clean.

These solids are composed of organics and inorganic matter. As the organic matter is usually in a fresh and undecomposed state, it is necessary to dispose of this mass of sewage solids, known as sludge, as quickly as possible in order to avoid the odors coincident with uncontrolled decomposition of these solids.

Various methods are in practical use for disposing of these solids which include drying the solids on beds of sand; and digesting or decomposing the solids in tanks designed for the purpose, but they all entail certain features of expense; area occupied; operation costs; and so forth, which render them anything but ideal.

Therefore, the object of this invention is to devise a method or process relating to the treatment of sewage, or trade wastes, which will hasten the disposal of these solids removed from the sewage by sedimentation which will reduce the cost of sewage sludge handling by reducing the number of necessary operations thereon; which will eliminate some of the construction and structures now required, thus also reducing the ground area required; and which will reduce the labor now entailed. In short, one of my objects is to render unnecessary the step of digestion. A further object is to arrange the sewage treating plant to be continuous, whereas at present the step of digestion is more or less intermittent. My aim is to devise a sewage treating plant which will be like a modern factory, the raw materials will be fed in at one end, and the finished product will be run out at the other end; the finished product in this case being an inert and odorless ash containing only fully consumed materials and capable of immediate disposal on land or fill.

To that end my invention may be said to reside in the filtration of undigested sludge and the incineration of the resulting filter cake. More particularly, the invention comprises the filtration of the sludge under such conditions that the cake is quickly dried and hardened so that it can be fed directly to an incinerator for burning. Another feature is that the incinerator gases are returned to the place of filtration of the sludge cake so that the heat therefrom is made use of in baking the cake to harden it. Still another feature is to be found in the form of the dried and hardened, or baked, filter cake which consists of thin dry twisted strips or pieces. And the control of the filter cake thickness to be as near as practically possible to ⅛th of an inch is another point which contributes to the success of my invention.

In order to aid in the understanding of my invention, I have shown diagrammatically in the accompanying drawing for the purposes of illustration, a flowsheet indicating my preferred arrangement or hook-up of well known elements or pieces of equipment.

The first piece of equipment the sewage encounters is a sedimentation tank of the type known as a Dorr clarifier. In the type I prefer to use, the tank 11 has a horizontally rotating radial arm 12 operated by a traction wheel 13. Associated with the arm 12 is a series of arms 14 bearing rakes 15 which constitute a sludge raking mechanism for collecting the sludge that settles on the tank bottom and discharges it as underflow from the discharge outlet 16 of the tank in the form of sludge. 17 represents the effluent launder of the clarifier.

The next piece of equipment encountered by the sludge is a standard form of mixing or agitating tank 20 in which there is provided an impeller 21. 22 represents a jacket surrounding the tank for heating its contents. Here any chemicals or chemical compounds or other aids usually used for conditioning raw sludge can be mixed with the sludge.

Next encountered by the sludge is a rotary filter 30 of the new Oliver hot drying filter type. This comprises a tank 31 for holding the filtrant, in which is revolved a drum 32 composed as is usual of filter cells or panels which have connected therewith means for alternately applying suction and blowback thereto. 33 represents the usual doctor blade for scraping the filter cake from the drum 32 and delivering it onto a conveyor 34. A casing or hood 35 is provided over the drum 32 and doctor blade 33 to form a chamber through which hot air or gas can be passed for the purpose of baking the filter cake quickly both during its formation and afterwards. An important point of this filter is that means are provided whereby the thickness of the filter cake is controlled so that it does not exceed ⅛th of an inch. This exceptional cake thinness with the hot air or gas applied thereto and therethrough dries and hardens the cake almost instantly. The filtrate from the filter is removed therefrom through outlet 36.

I have found by using the Oliver United Filters Corp, new hot drying filter for raw sewage where the cake thickness can be controlled to closely approximating ⅛th of an inch that the filter medium does not blind and that the filter cake of sewage sludge can be well dried in a few seconds. The cake dries or bakes all the way through without the usual trouble of case hardening. It hardens in strings or strips of material which are twisted and curled. The hot gas acting upon the thin filter cake first seems to cause the cake to crack up into small pieces, and as drying or baking rapidly continues, these pieces curl and twist up into grotesque shapes. This is the condition of the sludge before it leaves the conveyor 34.

The next piece of equipment in order is a usual incinerator 40 having an ash pit 41 and a stack 42. Arrangements are made to convey some of the hot stack gases to the hood 35 of the filter to provide for the necessary cake drying blasts and also some of the stack gases may be conveyed to the jacket 22 of the mixing tank 20 for use in heating the tank contents if desired to aid in their filtration.

Having now described the preferred form of equipment for use in my sewage treating system, it can be seen by referring to the flowsheet that the raw sewage is fed to a clarifier or sedimentation tank 11. After sedimentation, the settled sludge is discharged therefrom and fed to the mixing tank 20 where it is mixed and conditioned with lime, or other chemicals to aid the coagulation of solids therein. Leaving the tank 20, either hot or cold as conditions warrant, the sludge is pumped to the filter 30 where it is dewatered, the water or filtrate being returned to the sedimentation tank 11 and the solids, in the form of a filter cake, are discharged onto a conveyor 34 from whence they are conducted to an incinerator 40 and therein are burned. From the incinerator, they issue in the form of ashes which are inert and can be used immediately for spreading on land or as filling material, for they are odorless.

It will thus be seen that I have completely eliminated from my sewage treating system the usual bulky and expensive sewage digester which is now the "bottle-neck" of the capacity of sewage plant. I have also eliminated all necessity for aeration tanks because I do not need to activate the sludge. By eliminating the aeration tanks, I am not required to have a secondary sedimentation tank, so by my present invention I am able to cut down the equipment needed in a sewage treating plant by half. At the same time, I eliminate from my system all intermittently operating equipment so that every phase of my present plant is continuous in its operation.

I claim:

A process of treating sewage sludge which comprises the steps of filtering the sludge to form a filter cake, controlling said filter cake closely approximate ⅛th inch in thickness and exposing the cake to a baking temperature to form said cake into curved and twisted thin strips.

EDMUND B. BESSELIEVRE.